March 19, 1968 W. K. OWENS 3,373,956
OVERHEAD ROTOR AIRCRAFT
Filed Sept. 7, 1966 3 Sheets-Sheet 1

INVENTOR
Walter K. Owens

BY B. P. Fishburn, J.
ATTORNEY

March 19, 1968 W. K. OWENS 3,373,956
OVERHEAD ROTOR AIRCRAFT
Filed Sept. 7, 1966 3 Sheets-Sheet 3

INVENTOR
Walter K. Owens
BY
ATTORNEY ature of the invention,
United States Patent Office 3,373,956
Patented Mar. 19, 1968

3,373,956
OVERHEAD ROTOR AIRCRAFT
Walter K. Owens, Crestview, Fla., assignor to Souri, Inc., Pensacola, Fla., a corporation of Florida
Continuation-in-part of application Ser. No. 430,282, Feb. 4, 1965. This application Sept. 7, 1966, Ser. No. 577,662
7 Claims. (Cl. 244—4)

ABSTRACT OF THE DISCLOSURE

A single passenger overhead sustaining rotor aircraft in which said rotor has automatic gyroscopic cyclic pitch control means for the individual rotor blades operable in response to tilting of the depending aircraft structure away from the vertical, in combination with manually controllable fins which are constantly subjected to the downward air stream produced by the rotor.

---

This application is a continuation-in-part of my prior copending application Ser. No. 430,282, filed Feb. 4, 1965, now Patent No. 3,273,824, for Single Passenger Aircraft.

The present invention is an improvement upon and refinement of the aircraft disclosed in said prior application and among the objectives of this invention are to provide an aircraft having increased stability in flight, better maneuverability, better ability to hover, and more speed in directional flight.

Another and more specific object is to provide a single passenger aircraft having a unique split-type control fin, or vane through which steering is manually controlled with a minimum of effort.

Another object is to provide an overhead sustaining rotor which embodies a unique gyroscopic rotor blade pitch varying arrangement which operates in response to tilting of the depending aircraft structure away from a vertical position in response to manipulation of the control fins, there being no manually operated linkage between the rotor and the depending aircraft structure and the overall control of the craft depending on the downward blast of air from the rotor to the control fins.

Another object is to provide a sustaining rotor and gyroscopic control means for the rotor wherein the individual rotor blades have their pitch varied cyclically by twisting on their individual radial axes in response to swinging of the depending structure from the true vertical and in combination with the action of an overhead gyro stabilizing wheel or device.

Other objects and advantages of the invention will become apparent during the course of the following detailed description.

In the accompanying drawings forming a part of this application and in which like numerals are employed to designate like parts throughout the same, FIGURE 1 is a side elevation of a single passenger aircraft embodying the invention;

FIGURE 5 is a vertical section taken on line 5—5 of FIGURE 4;

Figure 1:
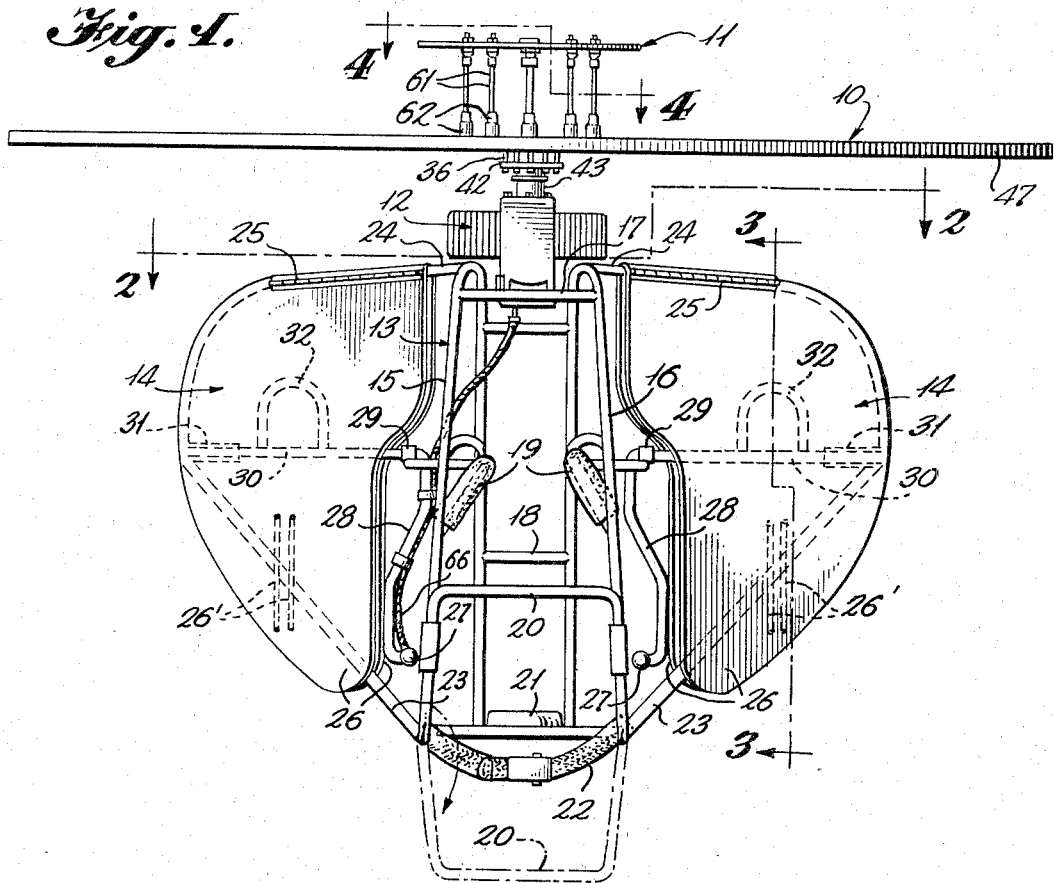
Figure 2:
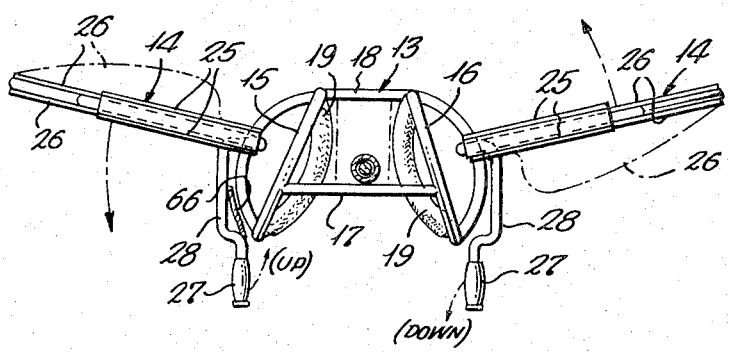
FIGURE 2 is a horizontal section taken on line 2—2 of FIGURE 1.

In the drawings, wherein for the purpose of illustration is shown a preferred embodiment of the invention, attention is directed first to FIGURES 1 and 2 showing the aircraft in its entirety. As shown in these figures, the aircraft comprises an overhead sustaining rotor 10 having an elevated gyro-plate 11 and associated linkage to automatically vary the pitch of rotor blades during the cycle of operation. The rotor is driven by an engine 12, securely mounted upon a depending aircraft frame structure 13 which supports the single passenger and also carries side control fins 14. As will be fully described, the control fins 14 are manually operated by the passenger to steer the aircraft. The control fins 14 are both directly under the rotor 10 in the downward airstream produced by the rotor, and it is this factor which enables the control fins to steer the craft and establish the directional flight thereof. There is no mechanical linkage or manual control between the frame 13 or fins 14 and the overhead rotor 10. The control fins are employed to turn the craft and to displace the frame 13 from a normal vertical axis and this in turn causes the gyro mechanism 11 to act on the blades of the rotor 10 and the craft in turn achieves a given direction of flight.

More specifically, the aircraft frame 13 comprises generally inverted U-shaped frame sides 15 and 16 rigidly connected by suitable cross braces 17 and 18, as shown. Near the vertical center of the frame 13, the same has side arcuate padded members 19 which engage over the shoulders of the single passenger when the passenger is positioned within the frame of the craft. A pivoted gate member 20 is provided on the front of the frame 13 at its bottom to enclose the passenger when elevated, as shown in full lines in FIGURE 1. The passenger may rest on a cycle-type seat 21 suitably secured to the bottom of the frame 13, and a restraining belt 22 or other conventional harnessing means may be employed. In effect, the aircraft "fits on" the passenger and the passenger is harnessed within the frame 13, generally in the same manner disclosed in the mentioned prior application.

Figure 3:
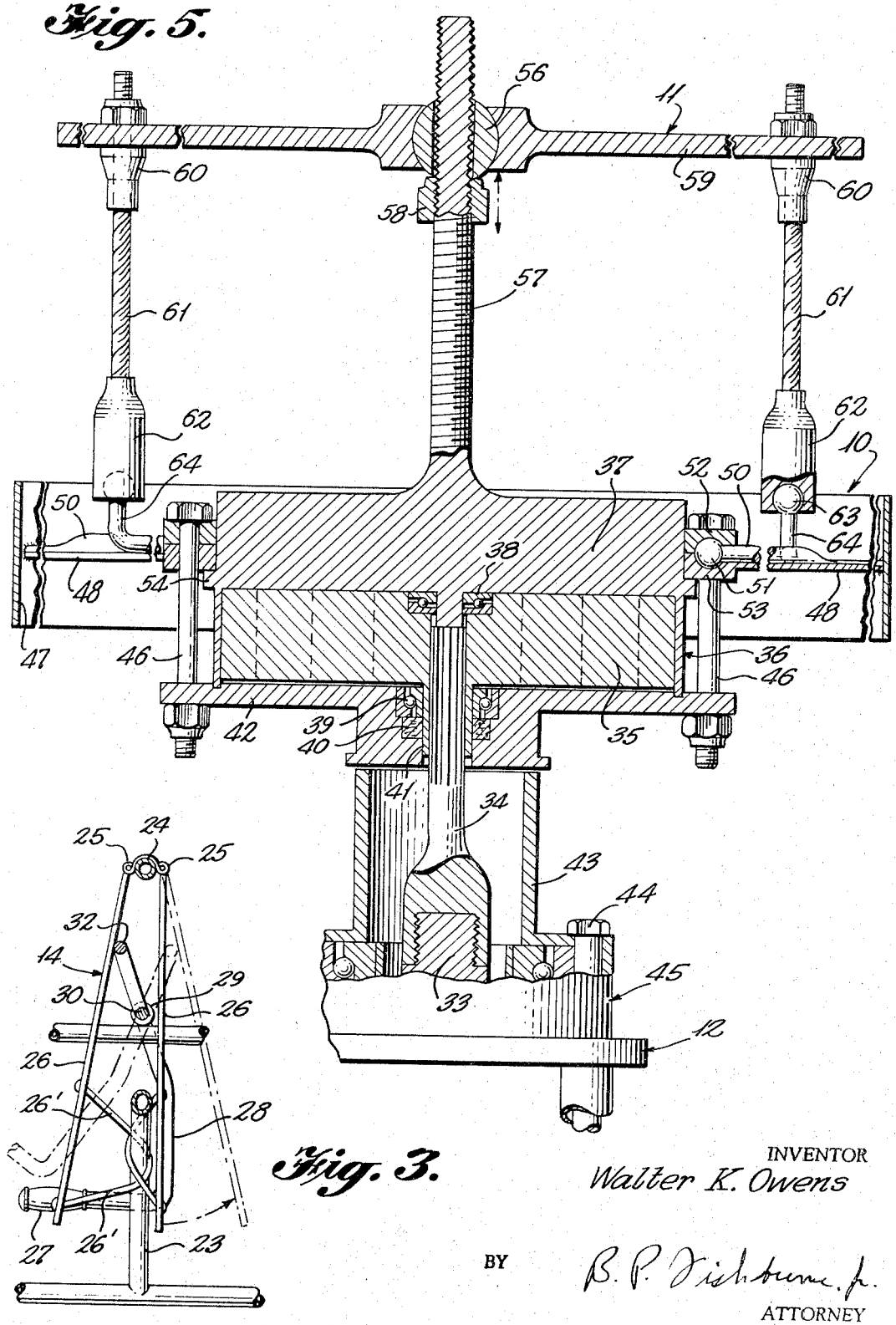
FIGURE 3 is a fragmentary vertical section taken on line 3—3 of FIGURE 1.
Figure 4:
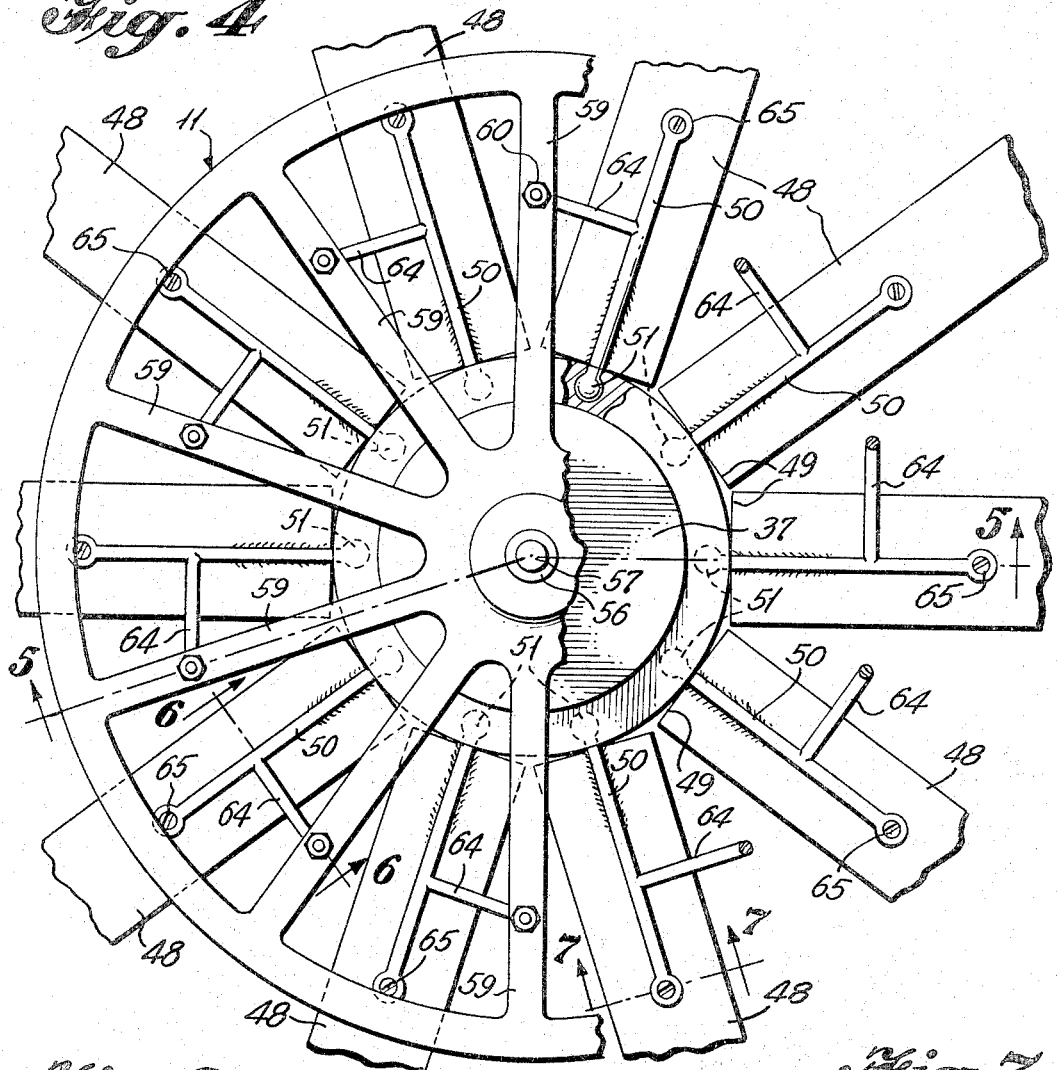
FIGURE 4 is an enlarged horizontal fragmentary section taken on line 4—4 of FIGURE 1.
Figure 6:
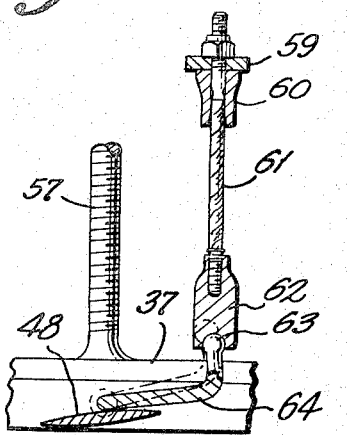
FIGURE 6 is a fragmentary vertical section taken on line 6—6 of FIGURE 4.

The frame 13 further comprises side extensions 23 including top lateral bars 24 which mount the hinges 25, FIGURE 3, for the control fins 14. Each fin 14 is split or divided, FIGURE 3, and consists of a pair of sections 26 each swingable vertically upon one of the hinges 25 under manual control of the passenger. Toward this end, a pair of side control handles 27 are provided on the opposite sides of the frame 13 including arms 28 which are independently swingable on pivots or bearings 29 secured to the frame structure. Horizontal rocker shafts 30 are integral with the arms 28 and turn in response to movement of the arms. The outer ends of these rocker shafts are journaled in outboard bearings 31 rigid with frame extensions 23. The rocker shafts 30 carry camming loops 32 disposed between the control fin sections 26, whereby each section selectively may be swung outwardly from the normal vertical to an inclined position by manipulation of the associated control handle, the latter being swingable either upwardly or downwardly. The control fin sections 26 are returned automatically to their normal vertical planes by stretchable elastic loops 26', FIGURE 3, these loops engaging around the rigid extensions or bars 23. Ends of the loops are permanently connected in any suitable manner with the respective sections 26.

Rigidly mounted upon the top of the frame 13 is the previously-mentioned engine 12. As shown in FIGURE 5, the engine 12 has a vertical crank shaft or drive shaft 33 coupled with a splined drive shaft extension 34, in turn coupled with and driving the rotor 35 of a conventional fluid coupling or clutch 36 shown diagrammatically in the drawings, and having an upper driven section 37. A preferably thrust-type bearing 38 is interposed between the driving and driven sections of the clutch. Another bearing 39 and seal 40 surround the hub 41 of clutch section 35 and are held within a clutch bottom plate 42, the latter being positioned above a non-rotatable housing section 43 secured at 44 to a mounting plate 45 on the top flange of the engine 12. The entire fluid clutch 36 forms a part of the rotor 10, previously mentioned. The clutch sections 35 and 37 are held in assembled relationship by vertical bolts 46, as shown in FIGURE 5.

The rotor proper comprises a relatively large diameter outer rim 47 to which the outer ends of a plurality of radial main rotor blades 48 are fixedly secured by welding or the like, the blades being capable of twisting on their longitudinal axes so as to have their pitch adjusted or changed cyclically. Any practical number of blades 48 may be employed. The inner ends 49 of the rotor blades are unattached to the rotor hub structure except through the medium of rods 50 rigidly connected to the blades near their inner ends by welding or the like. Each rod 50 has a ball end 51 fitted within a spherical socket formed between opposed rings 52 and 53, as shown in FIGURE 5. These rings receive the bolts 46 and also engage a marginal flange 54 on the fluid clutch upper section. The ball heads 51 have a free swivel connection within their sockets, so that the individual rotor blades 48 may twist at their inner ends, their outer ends being permanently fixedly secured to the rim 47.

As previously mentioned, a relatively massive gyro-stabilizing disc or wheel 11 is arranged above the rotor proper but constitutes a part of the overall rotor structure. The gyro-wheel 11 has a central swivel ball 56 which is vertically adjustable on a screw shaft extension 57 of driven clutch section 37. Raising or lowering of the gyro wheel 11 is accomplished through a nut 58 and this adjustment as will soon be described regulates the pitch or twist of the blades 48 initially.

Figure 7:
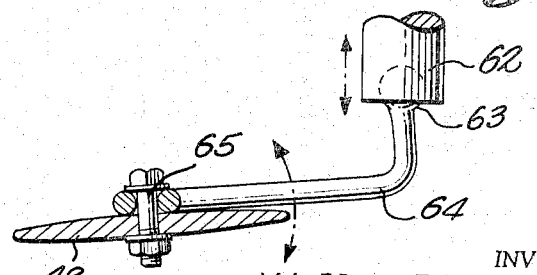
FIGURE 7 is a similar section taken on line 7—7 of FIGURE 4.

The gyro wheel 11 is preferably spoked as at 59 and these spokes 59 have secured to them substantially outwardly of the center of the gyro wheel adjustable clamp fittings 60 carried by the tops of flexible cable connectors 61 having lower fittings or heads 62 which have swiveled connection with ball heads 63 carried by L-shapd extensions 64 of rods 50. The extensions 64 are rigid with the rods 50. The outer ends of the rods 50 are preferably bolted at 65 to the adjacent rotor blade 48. By the above arrangement, the gyro wheel 11 is connected by one of the cables 61 with each rotor blade 48 so that the gyro wheel may control and vary cyclically the twist or pitch of each blade 48 as the machine operates. As stated, the pitch of all blades 48 may be adjusted by raising or lowering the nut 58, the extensions 64 serving as cranks to twist the individual blades 48 as clearly depicted in FIGURE 7 when the gyro wheel and connectors 61 are raised or lowered.

OPERATION

With the passenger properly harnessed in the frame 13 and the engine 12 operating, the rotor structure 10 will turn through the medium of the fluid clutch or coupling 36. The rotor structure includes the rim 47, blades 48, gyro wheel 11 and associated linkage, all driven by the output section 37 of the fluid clutch, the input section 35 of the clutch being directly driven by the engine shaft.

With the control handles 27 in neutral positions and both sections 26 of each split control fin 14 vertical, the craft will simply hover or ascend or descend vertically without directional movement. When it is desired to achieve directional flight toward any point on the compass, the frame 13 must be turned and must also be forced or swung away from the normal vertical position or axis. These two factors are accomplished by the passenger swinging the control handles 27 vertically to turn the rocker shafts 30 and the camming elements 32 to shift the fin sections 26 of each split control fin 14.

FIGURE 2 shows in broken lines the proper shifting of fin sections 26 to cause the craft to turn to the left.

One control handle is forced downwardly by the passenger while the other handle is pulled upwardly, as indicated by the legends in FIGURE 2. Incidentally, there is a conventional engine throttle control cable 66 leading from one of the control handles to the engine 12, as shown in FIGURE 1, so that the speed of the craft may be controlled at all times.

When the direction of flight has been established by manipulating the vanes 14 as shown and described, forward movement of the craft is achieved by shifting both control handles 27 in the same direction so that the camming loops 32 will act in the same manner on the divided fins 14. Before the craft can move in a given direction, its frame 13 must be displaced from the vertical, and this is accomplished through the action of the down draft from the rotor 10 over the control fins 14. If both control handles 27 are depressed by the passenger, the camming loops 32 will be swung forwardly, as shown in full lines in FIGURE 3, and the down draft from the rotor will cause the frame 13 to tilt forwardly at its top for forward flight. Rearward flight would be accomplished by elevating both handles 27 simultaneously. Flight in any direction is achieved by first turning the craft in the manner described and shown in FIGURE 2 and then by manipulating both handles simultaneously.

When the frame 13 is displaced from the vertical, the gyro wheel 11 resists such displacement and through the medium of the flexible connectors 61 and the crank extensions 64 and rods 50 causes twisting of the rotor blades 48 to change their pitch cyclically and thereby provide directional flight much in the same manner as directional flight is imparted to a helicopter. However, in the helicopter of conventional design, a very complex cyclic pitch control mechanism is required to adjust the pitch of the rotary wing during the different stages of rotation of the rotor. Also, the helicopter rotor must be mechanically tilted to achieve directional flight. In the present instance, the rotor 10 has no mechanical linkage to the frame 13 other than the driving connection through the clutch 36 and shafting 34 and 33. The rotor 10 does not tilt relative to the frame 13 in the invention. Instead, the action of the control fins 14 tends to tilt the machine from the vertical after a desired turning maneuver and this turning is counteracted by the gyro element 11 and the forces involved automatically produce the desired pitch control on the blades 48. Each blade 48 is twisted longitudinally, its outer tip being anchored to the rim 47 and its inner end being swiveled by the ball joint 51 as previously described.

In summary, the machine is first turned to a given direction as illustrated in FIGURE 2 and then caused to fly in said direction until another turn is desired. The control fins 14 resist spinning or torquing on the vertical axis of the craft and the divergent relationship of the control fins 14 shown in FIGURE 2 aids in lessening wind resistance during forward movement. Wind resistance is not a critical factor because the craft is not essentially a high speed craft. The divided fins 14 are always in the airstream from the rotor 10 and constitute the sole stabilizing and control surfaces for the craft which interact with the gyro means in the unique manner described.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An aircraft comprising a frame adapted for connection with the body of a passenger and supporting the passenger during flight, a manually operable control fin on each side of the frame and being independently operable by the passenger, each control fin being divided and including a pair of independently vertically swingable sections hinged at their tops to side portions of the frame, a manual control handle for each divided fin including a rockable camming element disposed between the sections of each fin so that each section may be swung vertically, elastic means returning each section automatically to a neutral substantially vertical position, an engine on the frame including a vertically extending drive shaft, and a rotor connected with the drive shaft and turned thereby, said rotor comprising a plurality of circumferentially spaced rotor blades, and gyro means on the rotor connected with each blade for automatically varying the pitch of each blade during a cycle of rotation of the rotor in response to tilting of the frame away from the vertical due to tilting of said fins.

2. An aircraft as defined by claim 1, and a rim on the rotor secured fixedly to the outer ends of the rotor blades, swivel means supporting the inner ends of said blades so that the blades may twist longitudinally under influence of said gyro means, said gyro means including connecting elements having a direct connection with each of said blades.

3. An aircraft as defined in claim 1, and wherein the gyro means comprises a gyro wheel located in a substantially horizontal plane above the rotor, means interconnecting the rotor and said wheel and operable to adjust the wheel vertically relative to the rotor, a plurality of flexible connecting elements secured to the wheel outwardly of its center, and linkage means interconnecting said elements and rotor blades and including crank parts tending to twist the rotor blades on their radial axes when displaced by said elements.

4. The invention as defined by claim 3, and wherein the inner ends of the rotor blades have a ball and socket connection with the rotor, and said crank parts have ball and socket connections with the flexible connecting elements.

5. An aircraft comprising a single passenger supporting frame adapted to be connected with the body of the passenger, a pair of lateral frame extensions on said frame on the opposite sides thereof, divided fins on said extensions including pairs of fin sections hinged to the tops of the extensions and being vertically swingable on their hinges, a manually operated vertically swingable control arm for each divided fin including a rockable camming part interposed between the sections of each divided fin, an engine on said frame, an overhead rotor above the engine and connected therewith and driven thereby and having plural radial blades which constantly create a down draft over the surfaces of said fins, a gyro element on the rotor above said blades, and linkage means connecting each blade with said gyro element so that the latter may automatically regulate the pitch of each blade during a cycle of rotation responsive to the tendency of said frame to tilt from the vertical in the direction of flight due to tilting of said fins manually.

6. An aircraft as defined by claim 5, and wherein said linkage means comprises cable elements connected with the gyro element and depending therefrom, and crank parts secured to the cable elements and rigidly connected with said blades to twist the latter on their longitudinal axes.

7. An aircraft as defined in claim 5, and a rim defining the periphery of the rotor and secured fixedly to the tips of the rotor blades, means forming a swiveled connection between the inner ends of the blades and said rotor, said linkage means including offset crank parts on said blades rigidly connected therewith, and flexible means interconnecting the crank parts with the gyro element, said element being a massive substantially horizontal wheel element above the plane of said blades.

References Cited
UNITED STATES PATENTS

| | | | |
|---|---|---|---|
| 2,456,942 | 12/1948 | Holbrook | 244—60 |
| 2,479,549 | 8/1949 | Ayres | 244—17 |
| 3,241,791 | 3/1966 | Piasecki | 244—6 |

FOREIGN PATENTS

| | | |
|---|---|---|
| 1,135,474 | 12/1956 | France. |

MILTON BUCHLER, *Primary Examiner.*

T. W. BUCKMAN, *Assistant Examiner.*